(12) United States Patent
Gunaratnam et al.

(10) Patent No.: US 7,366,510 B2
(45) Date of Patent: Apr. 29, 2008

(54) NETWORK SELECTION METHODS AND APPARATUS WITH HOME NETWORK PRIORITIZATION IN COUNTRY BORDER REGIONS

(75) Inventors: Jayasri Gunaratnam, Kitchener (CA); Noushad Naqvi, Waterloo (CA); Bryan Taylor, Kitchener (CA); Craig Ian Haight Swann, Waterloo (CA); Darcy Richard Phipps, Waterloo (CA); Hugh Hind, Waterloo (CA); Bao Quoc Nguyen, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 254 days.

(21) Appl. No.: 10/788,714

(22) Filed: Feb. 27, 2004

(65) Prior Publication Data

US 2005/0107082 A1    May 19, 2005

Related U.S. Application Data

(60) Provisional application No. 60/519,517, filed on Nov. 13, 2003.

(51) Int. Cl.
*H04Q 7/20* (2006.01)
(52) U.S. Cl. ............................. 455/435.2; 455/435.1; 455/433
(58) Field of Classification Search ................ 455/434, 455/432.1, 435, 435.1
See application file for complete search history.

(56) References Cited

U.S. PATENT DOCUMENTS 6,567,663 B1 * 5/2003 Otting et al. ................ 455/434
2005/0037755 A1 * 2/2005 Hind et al. .............. 455/435.3
2005/0113088 A1 * 5/2005 Zinn et al. ................ 455/435.2

FOREIGN PATENT DOCUMENTS

| EP | 0915631 A2 | 5/1999 |
| GB | 0 915 631 A3 * | 12/1999 |

(Continued)

OTHER PUBLICATIONS

"3rd Generation Partnership Project; Technical Specification Groug Core Network NAS Functions related to Mobile Stations (MS) In idle mode", Sep. 2003, V5.3.0.*

(Continued)

*Primary Examiner*—Lester G. Kincaid
*Assistant Examiner*—Fred Casca
(74) *Attorney, Agent, or Firm*—John J. Oskorep, Esq.

(57) ABSTRACT

Network selection methods and apparatus with home network prioritization in country border regions are disclosed. In one illustrative example, a mobile station (200) is associated with a home communication network (402) having a home mobile country code (MCC). Being outside of the home network country, however, the mobile station (200) selects and operates with a non-home communication network (406) having a visiting MCC. After expiration of a timer, the mobile station (200) scans to identify a plurality of networks in a coverage area within which the mobile station (200) is operating. If the home network (402) having the home MCC is identified as being available, the mobile station (200) selects and operates with the home network (200). Otherwise, if the non-home network (406) having the visiting MCC is identified as being available, the mobile station (200) selects and operates with the non-home network (406).

18 Claims, 6 Drawing Sheets

FOREIGN PATENT DOCUMENTS

WO     WO 02/069661 A2 *   9/2002

OTHER PUBLICATIONS

"PCT Search Report For Application PCT/CA2004/000293", Feb. 27, 2004.*

"3rd Generation Partnership Project; Technical Specification Group Core Network NAS Functions Related to Mobile Station (MS) in Idle Mode", Sep. 2003, pp. 1-33, Internet.

"PCT Search Report for Application PCT/CA2004/000293" Feb. 27, 2004.

* cited by examiner

NETWORK SELECTION METHODS AND APPARATUS WITH HOME NETWORK PRIORITIZATION IN COUNTRY BORDER REGIONS

CROSS-REFERENCE TO RELATED APPLICATION

This application claims the benefit of U.S. Provisional Patent Application Ser. No. 60/519,517 entitled "Network Selection Methods And Apparatus With Home Network Prioritization In Country Border Regions" filed on Nov. 13, 2003, which is hereby incorporated by reference herein.

BACKGROUND

1. Field of the Technology

The present application relates generally to mobile stations and network selection methods employed thereby.

2. Description of the Related Art

A mobile communication device, such as a cellular mobile station, is capable of making and receiving telephone calls and/or sending and receiving data over a wireless communication network. Before it is able to do this, the mobile station selects and registers with one of a plurality of communication networks which are available within its geographic coverage area. After registering with the selected network, the mobile station operates in an idle mode where it "camps-on" a particular wireless communication channel of the network to monitor for calls or messages. "Network selection" is the particular process performed by the mobile station for selecting the one communication network through which to register and operate.

Cellular telephony operation and network selection schemes are documented in standards specifications that govern the behavior of cellular mobile stations and associated systems. One well-known cellular standard is the Global System for Mobile Communications (GSM) standard. GSM 03.22/European Technical Standards Institute (ETSI) TX 100 930, Technical Specification (TS) 23.122 from the $3^{rd}$ Generation Partnership Project (3GPP), and other related standards specifications describe the many details of cellular operation and network selection. These documents describe how a mobile station behaves as it moves and roams between various regions and countries to maintain coverage with networks (referred to as Public Land Mobile Networks or PLMNs), primarily for the purpose of providing continuous telephone service.

Traditionally, a mobile station performs network selection by initially scanning to identify all available communication networks within its surrounding coverage area. Each network is identified by a unique Mobile Country Code (MCC) and Mobile Network Code (MNC) pair. If the "home network" (HPLMN) of the mobile station is available, the mobile station will ordinarily select and operate with the home network. If the HPLMN is unavailable, the mobile station will ordinarily select and operate with the communication network having the highest priority in a preferred network list stored in memory of the mobile station. There may be several preferred network lists, commonly referred to as Preferred PLMN lists (PPLMN lists), stored on a Subscriber Identity Module (SIM) card of the mobile station. For example, the PPLMN lists may include a user-controlled PPLMN (U-PPLMN) list and an operator-controlled PLMN (O-PPLMN) list. The above-described network selection method is commonly referred to as an "automatic" network selection method. As an alternative to this automatic selection method, an end-user of the mobile station may be provided with the ability to manually select from a plurality of listed available networks which are visibly displayed on the mobile station. This conventional network selection method may be referred to as a "manual" network selection method.

Some issues exist with conventional network selection techniques for a mobile station which particularly relate to operating with the HPLMN. According to the specifications, for example, a mobile station must not consider selecting any networks that are not in its current serving country. The serving country is identified by the MCC of the current network which serves the mobile station. This operation causes significant problems at the borders of two countries where the mobile station is able to "see" networks from both countries. In this scenario, the mobile station operates to ignore all networks (including its own HPLMN) that have an MCC that differs from the MCC of its current serving network. Such conventional operation is described in ETSI specs 23.122.

Accordingly, there is a resulting need for network selection methods and apparatus that overcome the deficiencies of the prior art.

SUMMARY

Network selection methods and apparatus with home network prioritization in country border regions are described herein. In one illustrative example, a mobile station is associated with a home communication network having a home mobile country code (MCC). Being outside of the home network country, however, the mobile station selects and operates with a non-home communication network having a visiting MCC. After expiration of a timer, the mobile station scans to identify a plurality of communication networks in a coverage area within which the mobile station is operating. If the home communication network having the home MCC is identified as being available, the mobile station selects and operates with the home communication network. Otherwise, if a non-home communication network having the visiting MCC is identified as being available, the mobile station selects and operates with the non-home communication network.

BRIEF DESCRIPTION OF THE DRAWINGS

Embodiments of present invention will now be described by way of example with reference to attached figures, wherein.

DETAILED DESCRIPTION OF THE PREFERRED EMBODIMENTS

Methods and apparatus for selecting a communication network by a mobile station are described herein. In one illustrative method, the mobile station is associated with a home communication network having a home mobile country code (MCC). The method includes the steps of selecting and operating with a non-home communication network having a visiting MCC and, after expiration of a periodic timer: scanning to identify a plurality of communication networks in a coverage area within which the mobile station is operating; if the home communication network having the home MCC is identified as being available by the scanning, selecting and operating with the home communication network; and otherwise, if the non-home communication network having the visiting MCC is identified as being available by the scanning, selecting and operating with the non-home communication network.

Figure 1:
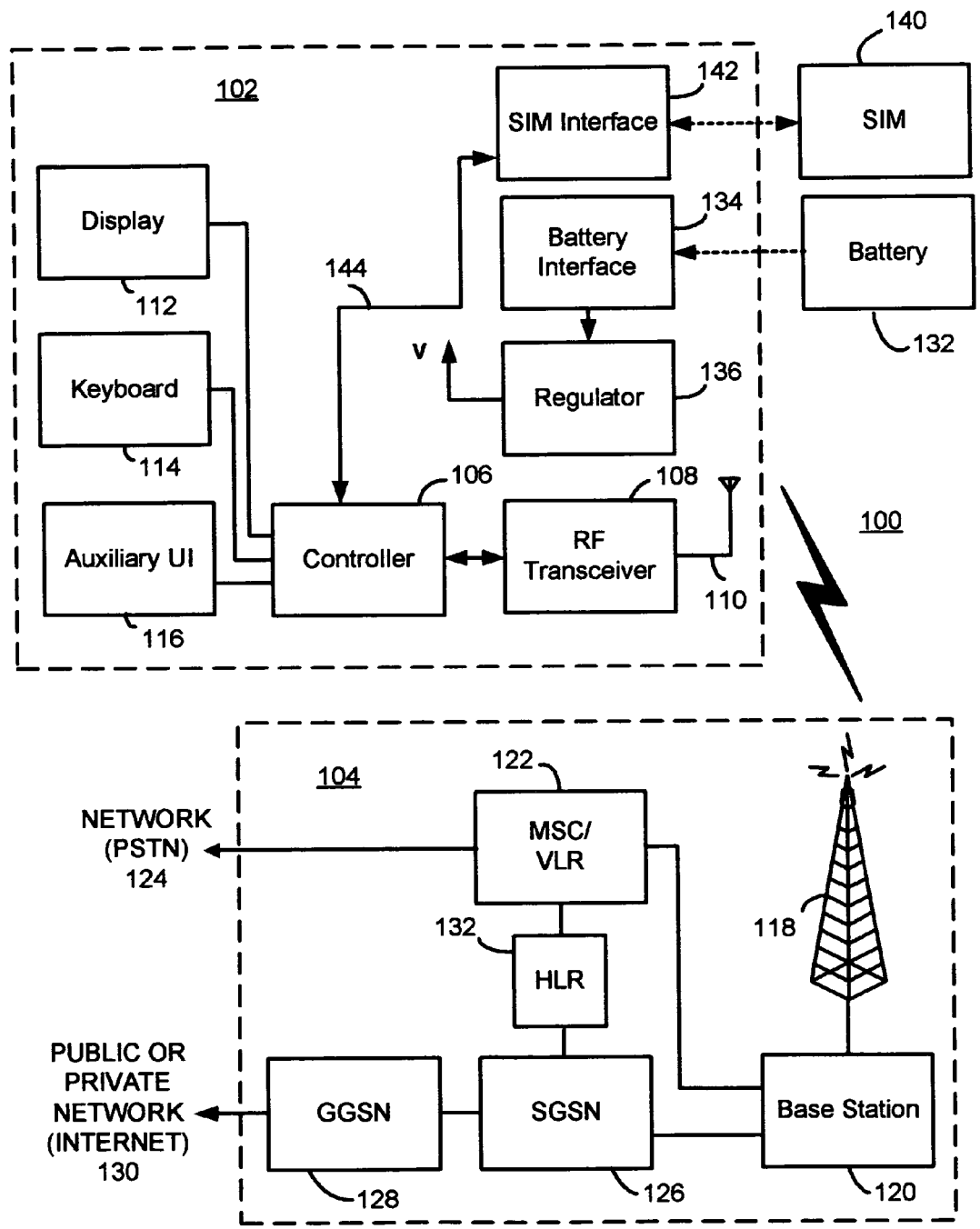
FIG. 1 is a block diagram of a communication system which includes a mobile station for communicating in a wireless communication network.

FIG. 1 is a block diagram of a communication system 100 which includes a mobile communication device 102 which communicates through a wireless communication network 104. Mobile communication device 102 preferably includes a visual display 112, a keyboard 114, and perhaps one or more auxiliary user interfaces (UI) 116, each of which are coupled to a controller 106. Controller 106 is also coupled to radio frequency (RF) transceiver circuitry 108 and an antenna 110.

In most modern communication devices, controller 106 is embodied as a central processing unit (CPU) which runs operating system software in a memory component (not shown). Controller 106 will normally control overall operation of mobile station 102, whereas signal processing operations associated with communication functions are typically performed in RF transceiver circuitry 108. Controller 106 interfaces with device display 112 to display received information, stored information, user inputs, and the like. Keyboard 114, which may be a telephone type keypad or full alphanumeric keyboard, is normally provided for entering data for storage in mobile station 102, information for transmission to network 104, a telephone number to place a telephone call, commands to be executed on mobile station 102, and possibly other or different user inputs.

Mobile station 102 sends communication signals to and receives communication signals from network 104 over a wireless link via antenna 110. RF transceiver circuitry 108 performs functions similar to those of base station 120, including for example modulation/demodulation and possibly encoding/decoding and encryption/decryption. It is also contemplated that RF transceiver circuitry 108 may perform certain functions in addition to those performed by base station 120. It will be apparent to those skilled in art that RF transceiver circuitry 108 will be adapted to particular wireless network or networks in which mobile station 102 is intended to operate.

Mobile station 102 includes a battery interface 134 for receiving one or more rechargeable batteries 132. Battery 132 provides electrical power to (most if not all) electrical circuitry in mobile station 102, and battery interface 134 provides for a mechanical and electrical connection for battery 132. Battery interface 134 is coupled to a regulator 136 which regulates power for the device. When mobile station 102 is fully operational, an RF transmitter of RF transceiver circuitry 108 is typically keyed or turned on only when it is sending to network, and is otherwise turned off to conserve resources. Such intermittent operation of transmitter has a dramatic effect on power consumption of mobile station 102. Similarly, an RF receiver of RF transceiver circuitry 108 is typically periodically turned off to conserve power until it is needed to receive signals or information (if at all) during designated time periods.

Mobile station 102 may consist of a single unit, such as a data communication device, a cellular telephone, a multiple-function communication device with data and voice communication capabilities, a personal digital assistant (PDA) enabled for wireless communication, or a computer incorporating an internal modem. Alternatively, mobile station 102 may be a multiple-module unit comprising a plurality of separate components, including but in no way limited to a computer or other device connected to a wireless modem. In particular, for example, in the mobile station block diagram of FIG. 1, RF transceiver circuitry 108 and antenna 110 may be implemented as a radio modem unit that may be inserted into a port on a laptop computer. In this case, the laptop computer would include display 112, keyboard 114, one or more auxiliary UIs 116, and controller 106 embodied as the computer's CPU. It is also contemplated that a computer or other equipment not normally capable of wireless communication may be adapted to connect to and effectively assume control of RF transceiver circuitry 108 and antenna 110 of a single-unit device such as one of those described above. Such a mobile station 102 may have a more particular implementation as described later in relation to mobile station 402 of FIG. 4.

Mobile station 102 operates using a Subscriber Identity Module (SIM) which is connected to or inserted at a SIM interface 142. SIM 140 is one type of a conventional "smart card" used to identify an end user (or subscriber) of mobile station 102 and to personalize the device, among other things. Without SIM 140, the mobile terminal is not fully operational for communication through wireless network 104. By inserting SIM 140 into the mobile terminal, an end user can have access to any and all of his/her subscribed services. In order to identify the subscriber, SIM 140 contains some user parameters such as an International Mobile Subscriber Identity (IMSI). In addition, SIM 140 is typically protected by a four-digit Personal Identification Number (PIN) which is stored therein and known only by the end user. An advantage of using SIM 140 is that end users are not necessarily bound by any single physical mobile terminal. Typically, the only element that personalizes a mobile terminal is a SIM card. Therefore, the user can access subscribed services using any mobile terminal equipped to operate with the user's SIM. SIM 140 generally includes a processor and memory for storing information. SIM and its interfacing standards are well known. For interfacing with a standard GSM device having SIM interface 142, a conventional SIM 140 has six (6) connections. A typical SIM 140 stores various information such as the IMSI and a preferred network list.

Mobile station 102 communicates in and through wireless communication network 104. In the embodiment of FIG. 1, wireless network 104 operates in accordance with a Global Systems for Mobile (GSM) and General Packet Radio Service (GPRS). Wireless network 104 includes a base station 120 with an associated antenna tower 118, a Mobile Switching Center (MSC) 122, a Home Location Register (HLR) 132, a Serving General Packet Radio Service (GPRS) Support Node (SGSN) 126, and a Gateway GPRS Support Node (GGSN) 128. MSC 122 is coupled to base station 120 and to a landline network, such as a Public Switched Telephone Network (PSTN) 124. SGSN 126 is coupled to base station 120 and to GGSN 128, which is in turn coupled to a public or private data network 130 (such as the Internet). HLR 132 is coupled to MSC 122 and SGSN 126.

Base station 120, including its associated controller and antenna tower 118, provides wireless network coverage for a particular coverage area commonly referred to as a "cell". Base station 120 transmits communication signals to and receives communication signals from mobile stations within its cell via antenna tower 118. Base station 120 normally performs such functions as modulation and possibly encoding and/or encryption of signals to be transmitted to the mobile station in accordance with particular, usually predetermined, communication protocols and parameters, under control of its controller. Base station 120 similarly demodulates and possibly decodes and decrypts, if necessary, any communication signals received from mobile station 102 within its cell. Communication protocols and parameters may vary between different networks. For example, one network may employ a different modulation scheme and operate at different frequencies than other networks.

The wireless link shown in communication system 100 of FIG. 1 represents one or more different channels, typically different radio frequency (RF) channels, and associated protocols used between wireless network 104 and mobile station 102. An RF channel is a limited resource that must be conserved, typically due to limits in overall bandwidth and a limited battery power of mobile station 102. Those skilled in art will appreciate that a wireless network in actual practice may include hundreds of cells, each served by a distinct base station 120 and transceiver, depending upon desired overall expanse of network coverage. All base station controllers and base stations may be connected by multiple switches and routers (not shown), controlled by multiple network controllers.

For all mobile station's 102 registered with a network operator, permanent data (such as mobile station 102 user's profile) as well as temporary data (such as mobile station's 102 current location) are stored in HLR 132. In case of a voice call to mobile station 102, HLR 132 is queried to determine the current location of mobile station 102. A Visitor Location Register (VLR) of MSC 122 is responsible for a group of location areas and stores the data of those mobile stations that are currently in its area of responsibility. This includes parts of the permanent mobile station data that have been transmitted from HLR 132 to the VLR for faster access. However, the VLR of MSC 122 may also assign and store local data, such as temporary identifications. Optionally, the VLR of MSC 122 can be enhanced for more efficient co-ordination of GPRS and non-GPRS services and functionality (e.g. paging for circuit-switched calls which can be performed more efficiently via SGSN 126, and combined GPRS and non-GPRS location updates).

Being part of the GPRS network, Serving GPRS Support Node (SGSN) 126 is at the same hierarchical level as MSC 122 and keeps track of the individual locations of mobile stations. SGSN 126 also performs security functions and access control. Gateway GPRS Support Node (GGSN) 128 provides interworking with external packet-switched networks and is connected with SGSNs (such as SGSN 126) via an IP-based GPRS backbone network. SGSN 126 performs authentication and cipher setting procedures based on the same algorithms, keys, and criteria as in existing GSM. In conventional operation, cell selection may be performed autonomously by mobile station 102 or by base station 120 instructing mobile station 102 to select a particular cell. Mobile station 102 informs wireless network 104 when it reselects another cell or group of cells, known as a routing area.

In order to access GPRS services, mobile station 102 first makes its presence known to wireless network 104 by performing what is known as a GPRS "attach". This operation establishes a logical link between mobile station 102 and SGSN 126 and makes mobile station 102 available to receive, for example, pages via SGSN, notifications of incoming GPRS data, or SMS messages over GPRS. In order to send and receive GPRS data, mobile station 102 assists in activating the packet data address that it wants to use. This operation makes mobile station 102 known to GGSN 128; interworking with external data networks can thereafter commence. User data may be transferred transparently between mobile station 102 and the external data networks using, for example, encapsulation and tunneling. Data packets are equipped with GPRS-specific protocol information and transferred between mobile station 102 and GGSN 128.

As apparent from the above, the wireless network includes fixed network components including RF transceivers, amplifiers, base station controllers, network servers, and servers connected to network. Those skilled in art will appreciate that a wireless network may be connected to other systems, possibly including other networks, not explicitly shown in FIG. 1. A network will normally be transmitting at very least some sort of paging and system information on an ongoing basis, even if there is no actual packet data exchanged. Although the network consists of many parts, these parts all work together to result in certain behaviours at the wireless link.

Figure 2:
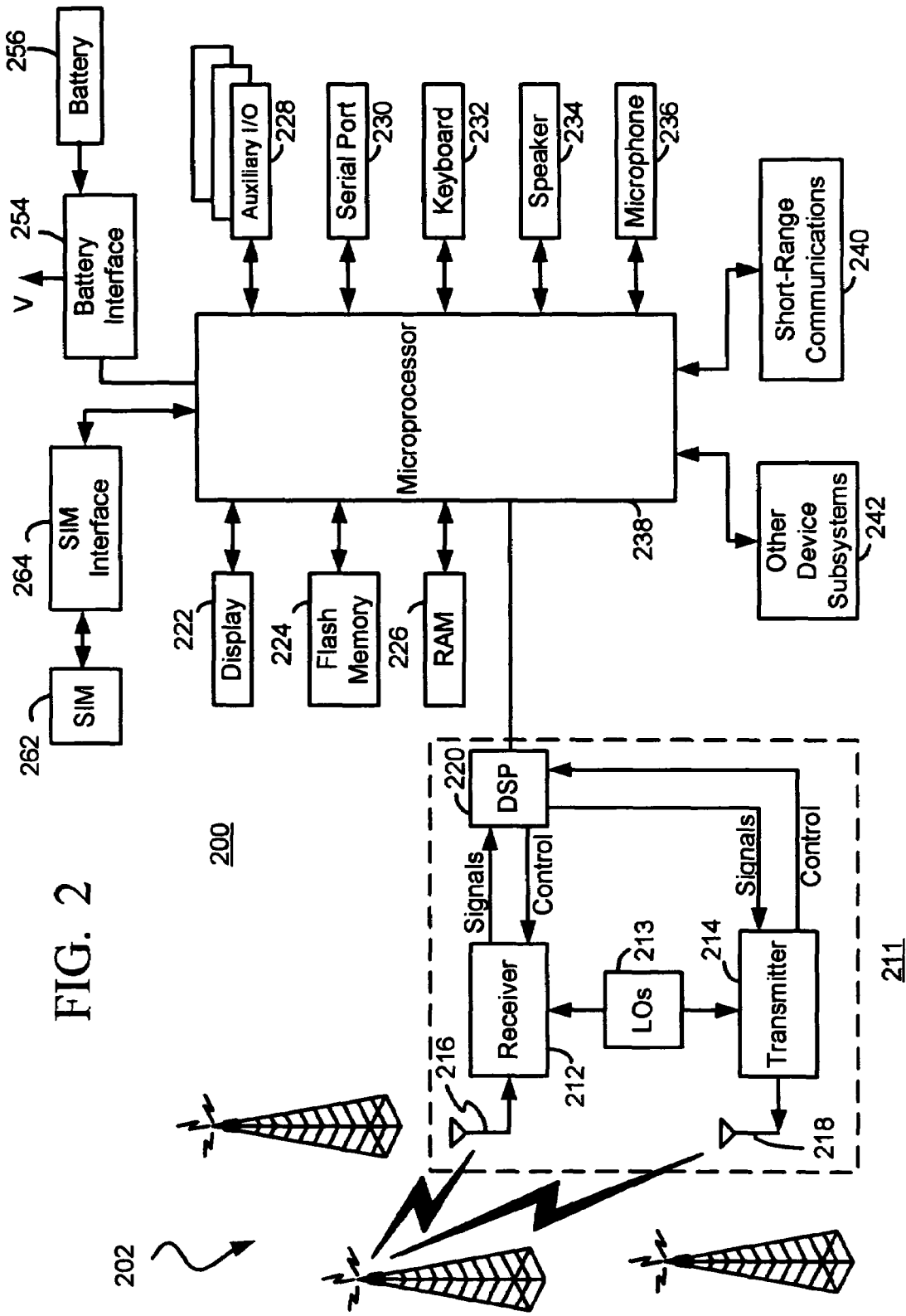
FIG. 2 is a more detailed example of a mobile station for use in the wireless communication network.

FIG. 2 is a detailed block diagram of a preferred mobile station 200 utilized for FIG. 1. Mobile station 200 is preferably a two-way communication device having voice and data communication capabilities, including the capability to communicate with other computer systems. Depending on the functionality provided by mobile station 200, it may be referred to as a data messaging device, a two-way pager, a cellular telephone with data messaging capabilities, a wireless Internet appliance, or a data communication device (with or without telephony capabilities).

If mobile station 200 is enabled for two-way communication, it will normally incorporate a communication subsystem 211, which includes a receiver 212, a transmitter 214, and associated components, such as one or more (preferably embedded or internal) antenna elements 216 and 218, local oscillators (LOs) 213, and a processing module such as a digital signal processor (DSP) 220. Communication subsystem 211 is analogous to RF transceiver circuitry 108 and antenna 110 shown in FIG. 1. As will be apparent to those skilled in field of communications, particular design of communication subsystem 211 depends on the communication network in which mobile station 200 is intended to operate.

Network access requirements will also vary depending upon type of network utilized. In GPRS networks, for example, network access is associated with a subscriber or user of mobile station 200. A GPRS device therefore requires a Subscriber Identity Module, commonly referred to as a "SIM" 262, in order to operate on the GPRS network. Without such a SIM 262 inserted in a SIM interface 264, a GPRS device will not be fully functional. Local or non-network communication functions (if any) may be operable, but mobile station 610 will be unable to carry out any functions involving communications over the network. SIM 262 includes those features described in relation to FIG. 1.

Mobile station 200 will operate in connection with one of a plurality of base stations 202 associated with the same or different networks at any given time. Mobile station 200 may send and receive communication signals with the selected network after required network registration or activation procedures have been completed. Network selection of the present application is described in relation to FIG. 6 below. Signals received by antenna 216 through the network are input to receiver 212, which may perform such common receiver functions as signal amplification, frequency down conversion, filtering, channel selection, and like, and in example shown in FIG. 2, analog-to-digital (A/D) conversion. A/D conversion of a received signal allows more complex communication functions such as demodulation and decoding to be performed in DSP 220. In a similar manner, signals to be transmitted are processed, including modulation and encoding, for example, by DSP 220. These DSP-processed signals are input to transmitter 214 for digital-to-analog (D/A) conversion, frequency up conversion, filtering, amplification and transmission over communication network via antenna 218. DSP 220 not only processes communication signals, but also provides for receiver and transmitter control. For example, the gains applied to communication signals in receiver 212 and transmitter 214 may be adaptively controlled through automatic gain control algorithms implemented in DSP 220.

Mobile station 200 includes a microprocessor 238 (which is one implementation of controller 106 of FIG. 1) which controls overall operation of mobile station 200. Communication functions, including at least data and voice communications, are performed through communication subsystem 211. Microprocessor 238 also interacts with additional device subsystems such as a display 222, a flash memory 224, a random access memory (RAM) 226, auxiliary input/output (I/O) subsystems 228, a serial port 230, a keyboard 232, a speaker 234, a microphone 236, a short-range communications subsystem 240, and any other device subsystems generally designated at 242. Data and control lines 260 extend between SIM interface 264 and microprocessor 238 for communicating data therebetween and for control. Some of the subsystems shown in FIG. 2 perform communication-related functions, whereas other subsystems may provide "resident" or on-device functions. Notably, some subsystems, such as keyboard 232 and display 222, for example, may be used for both communication-related functions, such as entering a text message for transmission over a communication network, and device-resident functions such as a calculator or task list. Operating system software used by microprocessor 238 is preferably stored in a persistent store such as flash memory 224, which may alternatively be a read-only memory (ROM) or similar storage element (not shown). Those skilled in the art will appreciate that the operating system, specific device applications, or parts thereof, may be temporarily loaded into a volatile store such as RAM 226.

Microprocessor 238, in addition to its operating system functions, preferably enables execution of software applications on mobile station 200. A predetermined set of applications which control basic device operations, including at least data and voice communication applications (such as a network selection scheme), will normally be installed on mobile station 200 during its manufacture. A preferred application that may be loaded onto mobile station 200 may be a personal information manager (PM application having the ability to organize and manage data items relating to user such as, but not limited to, e-mail, calendar events, voice mails, appointments, and task items. Naturally, one or more memory stores are available on mobile station 200 and SIM 262 to facilitate storage of PIM data items and other information.

The PIM application preferably has the ability to send and receive data items via the wireless network. In a preferred embodiment, PIM data items are seamlessly integrated, synchronized, and updated via the wireless network, with the mobile station user's corresponding data items stored and/or associated with a host computer system thereby creating a mirrored host computer on mobile station 200 with respect to such items. This is especially advantageous where the host computer system is the mobile station user's office computer system. Additional applications may also be loaded onto mobile station 200 through network, an auxiliary I/O subsystem 228, serial port 230, short-range communications subsystem 240, or any other suitable subsystem 242, and installed by a user in RAM 226 or preferably a non-volatile store (not shown) for execution by microprocessor 238. Such flexibility in application installation increases the functionality of mobile station 200 and may provide enhanced on-device functions, communication-related functions, or both. For example, secure communication applications may enable electronic commerce functions and other such financial transactions to be performed using mobile station 200.

In a data communication mode, a received signal such as a text message or web page download will be processed by communication subsystem 211 and input to microprocessor 238. Microprocessor 238 will preferably further process the signal for output to display 222 or alternatively to auxiliary I/O device 228. A user of mobile station 200 may also compose data items, such as e-mail messages or short message service (SMS) messages, for example, using keyboard 232 in conjunction with display 222 and possibly auxiliary I/O device 228. Keyboard 232 is preferably a complete alphanumeric keyboard and/or telephone-type keypad. These composed items may be transmitted over a communication network through communication subsystem 211.

For voice communications, the overall operation of mobile station 200 is substantially similar, except that the received signals would be output to speaker 234 and signals for transmission would be generated by microphone 236. Alternative voice or audio I/O subsystems, such as a voice message recording subsystem, may also be implemented on mobile station 200. Although voice or audio signal output is preferably accomplished primarily through speaker 234, display 222 may also be used to provide an indication of the identity of a calling party, duration of a voice call, or other voice call related information, as some examples.

Serial port 230 in FIG. 2 is normally implemented in a personal digital assistant (PDA)-type communication device for which synchronization with a user's desktop computer is a desirable, albeit optional, component. Serial port 230 enables a user to set preferences through an external device or software application and extends the capabilities of mobile station 200 by providing for information or software downloads to mobile station 200 other than through a wireless communication network. The alternate download path may, for example, be used to load an encryption key onto mobile station 200 through a direct and thus reliable and trusted connection to thereby provide secure device communication.

Short-range communications subsystem 240 of FIG. 2 is an additional optional component which provides for communication between mobile station 200 and different systems or devices, which need not necessarily be similar devices. For example, subsystem 240 may include an infrared device and associated circuits and components, or a Bluetooth™ communication module to provide for communication with similarly-enabled systems and devices. Bluetooth™ is a registered trademark of Bluetooth SIG, Inc.

Mobile station 200 also includes a battery interface 254 for receiving one or more rechargeable batteries 256. Such a battery 256 provides electrical power to most if not all electrical circuitry in mobile station 200, and battery interface 254 provides for a mechanical and electrical connection for it. Battery interface 254 is coupled to a regulator (not shown in FIG. 2) which regulates power to all of the circuitry.

Figure 3:
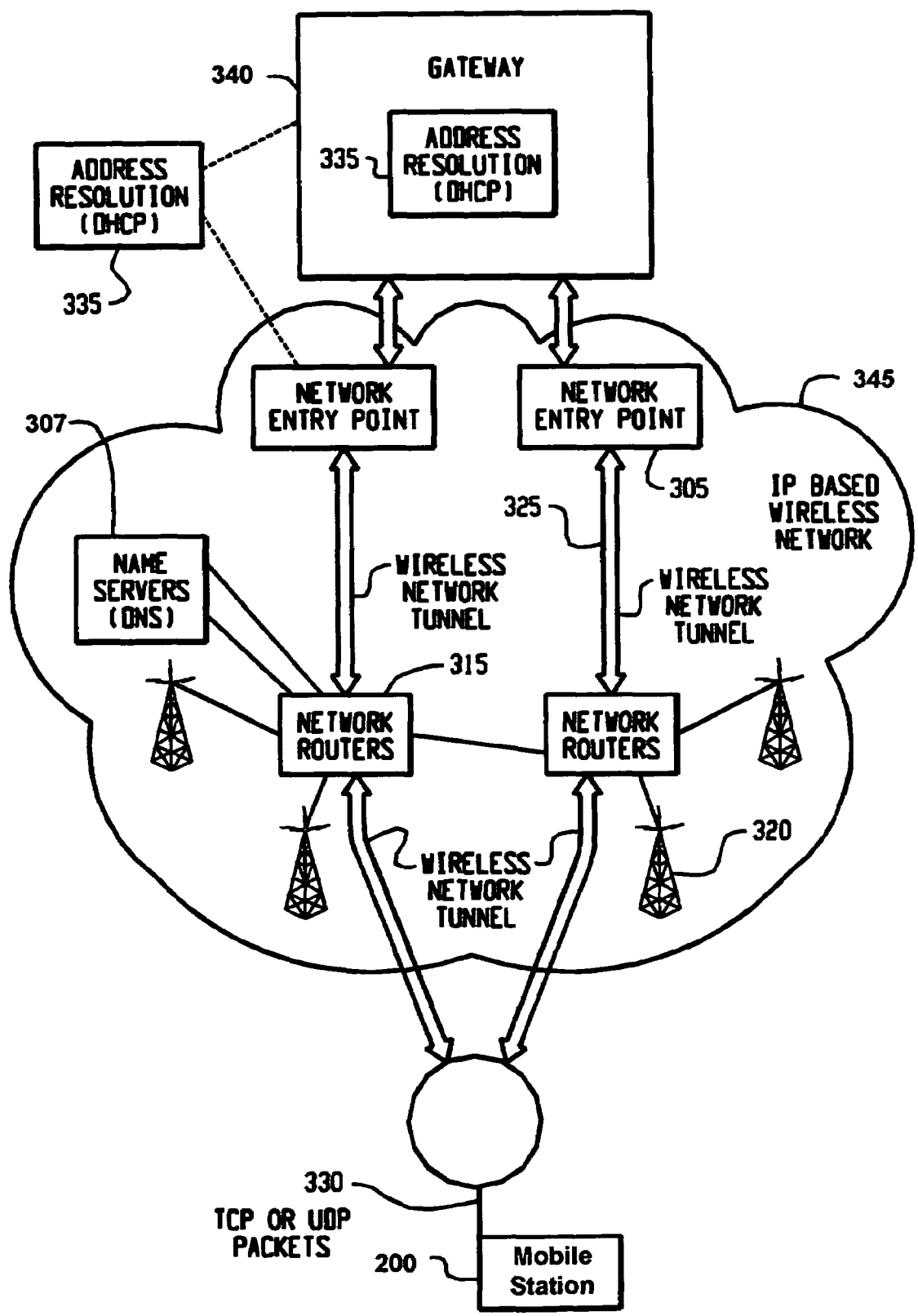
FIG. 3 is a particular structure of a system for communicating with the mobile station.

FIG. 3 shows a particular system structure for communicating with a mobile station. In particular, FIG. 3 shows basic components of an IP-based wireless data network, such as a GPRS network. Mobile station 200 communicates with a wireless packet data network 345, and may also be capable of communicating with a wireless voice network (not shown). The voice network may be associated with IP-based wireless network 345 similar to, for example, GSM and GPRS networks, or alternatively may be a completely separate network. The GPRS IP-based data network is unique in that it is effectively an overlay on the GSM voice network. As such, GPRS components will either extend existing GSM components, such as base stations 320, or require additional components to be added, such as an advanced Gateway GPRS Service Node (GGSN) as a network entry point 305.

As shown in FIG. 3, a gateway 340 may be coupled to an internal or external address resolution component 335 and one or more network entry points 305. Data packets are transmitted from gateway 340, which is source of information to be transmitted to mobile station 200, through network 345 by setting up a wireless network tunnel 325 from gateway 340 to mobile station 200. In order to create this wireless tunnel 325, a unique network address is associated with mobile station 200. In an IP-based wireless network, however, network addresses are typically not permanently assigned to a particular mobile station 200 but instead are dynamically allocated on an as-needed basis. It is thus preferable for mobile station 200 to acquire a network address and for gateway 340 to determine this address so as to establish wireless tunnel 325.

Network entry point 305 is generally used to multiplex and demultiplex amongst many gateways, corporate servers, and bulk connections such as the Internet, for example. There are normally very few of these network entry points 305, since they are also intended to centralize externally available wireless network services. Network entry points 305 often use some form of an address resolution component 335 that assists in address assignment and lookup between gateways and mobile stations. In this example, address resolution component 335 is shown as a dynamic host configuration protocol (DHCP) as one method for providing an address resolution mechanism.

A central internal component of wireless data network 345 is a network router 315. Normally, network routers 315 are proprietary to the particular network, but they could alternatively be constructed from standard commercially available hardware. The purpose of network routers 315 is to centralize thousands of base stations 320 normally implemented in a relatively large network into a central location for a long-haul connection back to network entry point 305. In some networks there may be multiple tiers of network routers 315 and cases where there are master and slave network routers 315, but in all such cases the functions are similar. Often network router 315 will access a name server 307, in this case shown as a dynamic name server (DNS) 307 as used in the Internet, to look up destinations for routing data messages. Base stations 320, as described above, provide wireless links to mobile stations such as mobile station 200.

Wireless network tunnels such as a wireless tunnel 325 are opened across wireless network 345 in order to allocate necessary memory, routing, and address resources to deliver IP packets. In GPRS, such tunnels 325 are established as part of what are referred to as "PDP contexts" (i.e. data sessions). To open wireless tunnel 325, mobile station 200 must use a specific technique associated with wireless network 345. The step of opening such a wireless tunnel 325 may require mobile station 200 to indicate the domain, or network entry point 305 with which it wishes to open wireless tunnel 325. In this example, the tunnel first reaches network router 315 which uses name server 307 to determine which network entry point 305 matches the domain provided. Multiple wireless tunnels can be opened from one mobile station 200 for redundancy, or to access different gateways and services on the network. Once the domain name is found, the tunnel is then extended to network entry point 305 and necessary resources are allocated at each of the nodes along the way. Network entry point 305 then uses the address resolution (or DHCP 335) component to allocate an IP address for mobile station 200. When an IP address has been allocated to mobile station 200 and communicated to gateway 340, information can then be forwarded from gateway 340 to mobile station 200.

Wireless tunnel 325 typically has a limited life, depending on mobile station's 100 coverage profile and activity. Wireless network 345 will tear down wireless tunnel 325 after a certain period of inactivity or out-of-coverage period, in order to recapture resources held by this wireless tunnel 325 for other users. The main reason for this is to reclaim the IP address temporarily reserved for mobile station 200 when wireless tunnel 325 was first opened. Once the IP address is lost and wireless tunnel 325 is torn down, gateway 340 loses all ability to initiate IP data packets to mobile station 200, whether over Transmission Control Protocol (TCP) or over User Datagram Protocol (UDP).

In this application, an "IP-based wireless network" (one specific type of wireless communication network) may include but is not limited to: (1) a Code Division Multiple Access (CDMA) network that has been developed and operated by Qualcomm; (2) a General Packet Radio Service (GPRS) network for use in conjunction with Global System for Mobile Communications (GSM) network both developed by standards committee of European Conference of Postal and Telecommunications Administrations (CEPT); and (3) future third-generation (3G) networks like Enhanced Data rates for GSM Evolution (EDGE) and Universal Mobile Telecommunications System (UMTS). It is to be understood that although particular IP-based wireless networks have been described, the communication re-establishment schemes of the present application could be utilized in any suitable type of wireless packet data network.

The infrastructure shown and described in relation to FIG. 3 may be representative of each one of a number of different communication networks which are provided and available in the same geographic region. One of these communication networks will be selected by the mobile station, either in an automatic or manual fashion, for communications.

Figure 4:
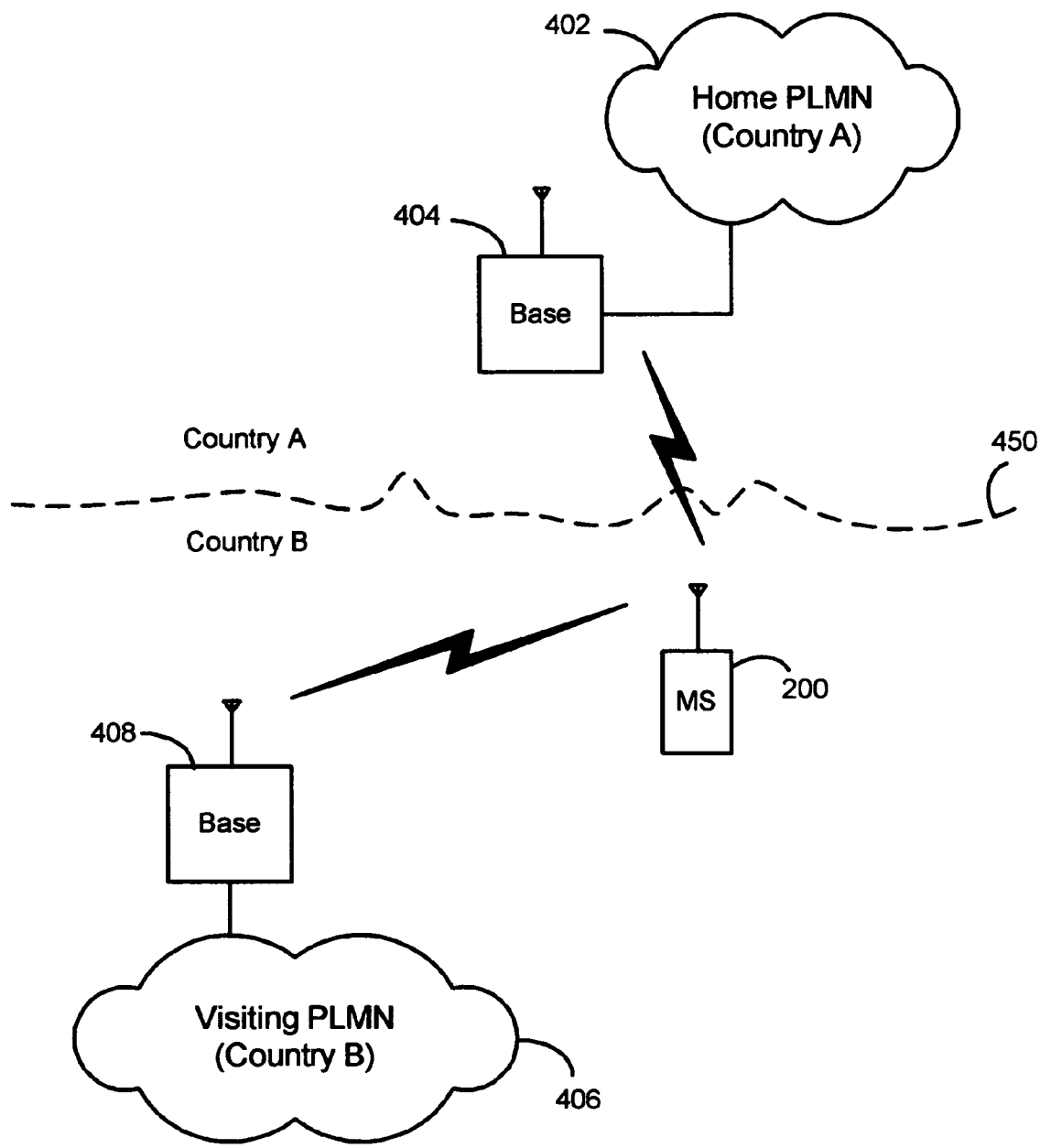
FIG. 4 is an illustration of a mobile station which is currently registered with and communicating through a visiting network having a first Mobile Country Code (MCC) when its home network having a second MCC is made available.

FIG. 4 is an illustration of mobile station 200 being currently registered with and communicating through a visiting network 406 in Country "B" when its home network 402 in Country "A" is subsequently made available. A border 450 separates Country A and Country B. Home network 402 in Country A has a base station 404 through which mobile station 200 may communicate. Home network 402 is associated with a first Mobile Country Code (MCC) and a first Mobile Network Code (MNC). The first MCC corresponds to Country A. On the other hand, visiting network 406 in Country B has a base station 408 though which mobile station 200 may communicate. Visiting network 406 is associated with a second MCC and a second MNC. The second MCC corresponds to Country B and is different from the first MCC. MNC/MCC pairs uniquely identify a given network; they are broadcasted by base stations and received by mobile stations 200 during scanning operations.

Consider the situation where mobile station 200 is being initially served by visiting network 406 in Country B. According to the specifications, during its periodic scans mobile station 200 must not consider selecting any networks that are not in the current "serving" Country B. That is, mobile station 200 must not select any network that does not broadcast the second MCC of visiting network 406. This operation causes significant problems at the borders (e.g. border 450) of two countries (e.g. Countries A and B) where mobile station 200 is able to "see" networks from both countries. In this scenario, mobile station 200 operates to ignore all networks (including its own home network 402) that have an MCC that differs from the MCC of its current serving network.

Figure 5:
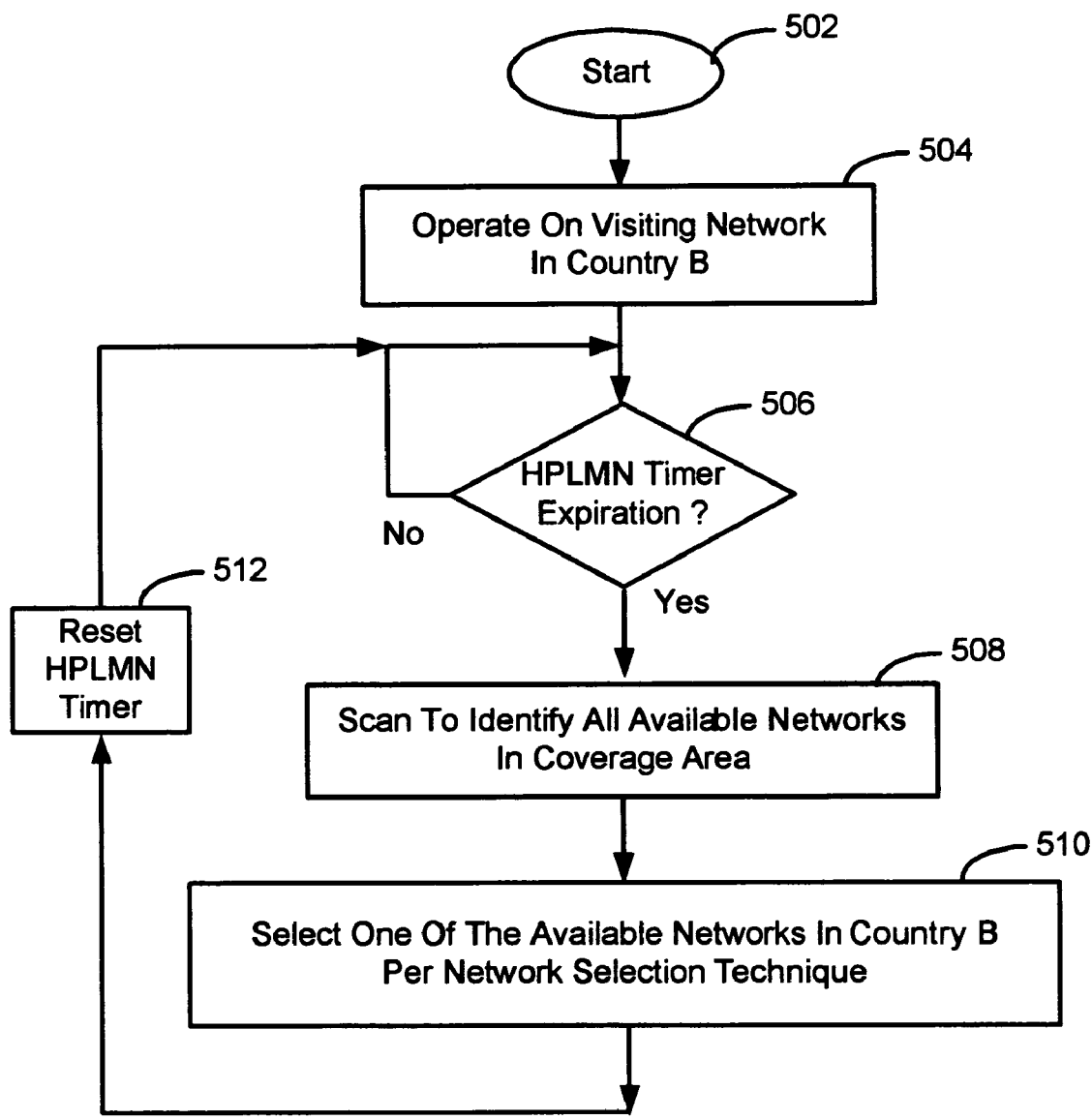
FIG. 5 is a flowchart for describing a method of selecting a communication network according to current standards.

FIG. 5 is a flowchart for further describing a method of selecting a communication network according to current standards. Such conventional operation is described in ETSI Specification Documents 23.122. Beginning at a start block 502, a mobile station is operating on a visiting network in Country B (step 504) (e.g. visiting network 406 of FIG. 4). The visiting network in Country B is not the home network of the mobile station; the home network has a first MCC and the visiting network has a second MCC that is different from the first MCC.

Since the mobile station is not operating on its home network, a periodic "home network timer" (or HPLMN timer) has been set and running so that the mobile station may perform periodic scans for its home network. If the home network timer has not expired (step 506), the mobile station continues to wait until such expiration. If the home network timer has expired at step 506, the mobile station performs a scanning operation to identify all available networks within its coverage area (step 508). Note that the available networks may include the home network of the mobile station which is in a bordering Country A (e.g. home network 402 of FIG. 4).

Per the current standards, the mobile station must select from those networks in Country B using network selection techniques (e.g. based on a prioritized network list) (step 510). If the home network in Country A is available, the mobile station will not select it in step 510 given these current standards. The current standards require that the MCC should match that of the previously utilized network and, in this scenario, it does not. Thus, the home network is not selected by the mobile station in step 510, the home network timer is reset (step 512), and the method continues back at step 506. When the home network timer subsequently expires, the mobile station will again fail to select the home network in Country A.

Figure 6:
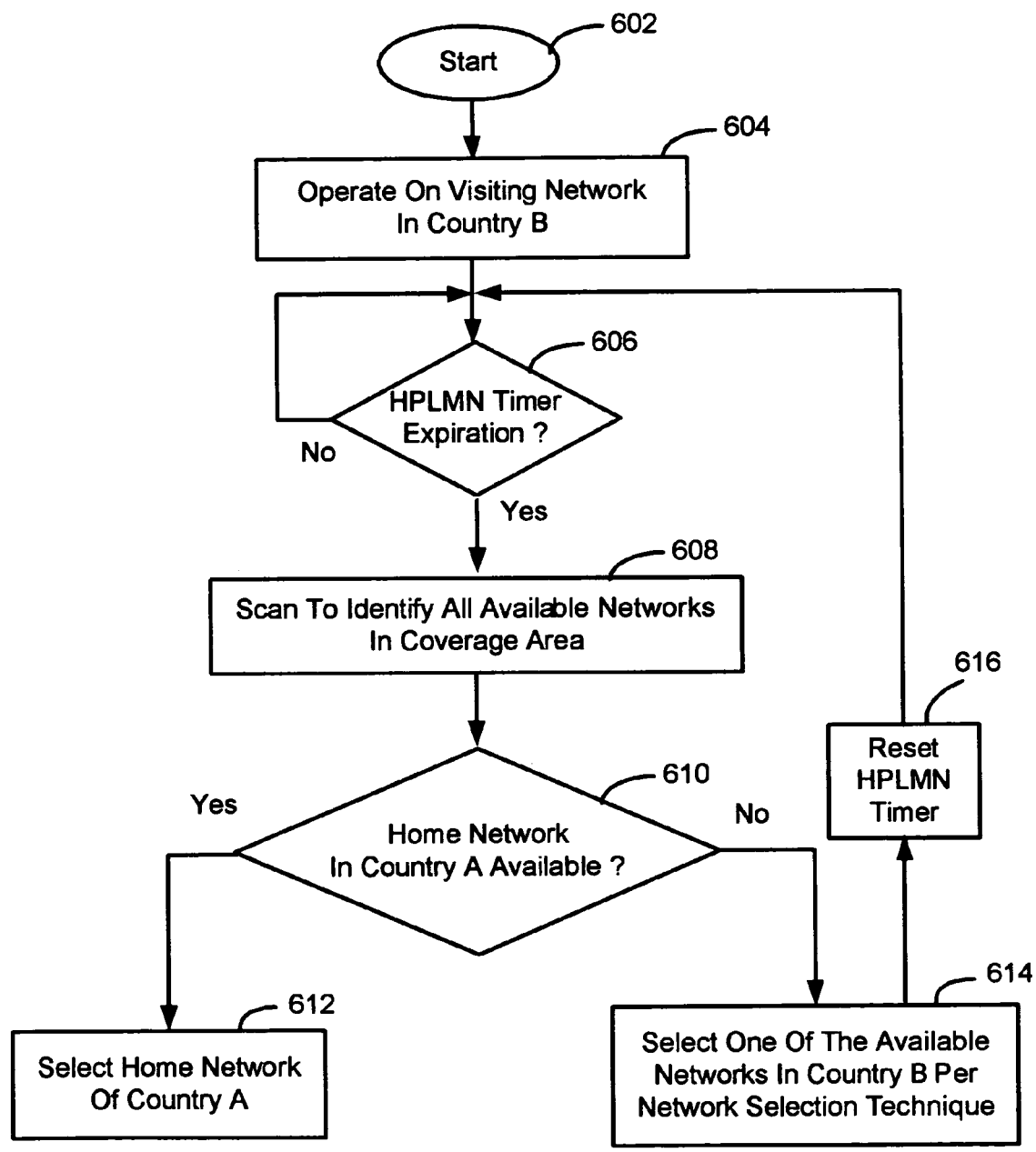
FIG. 6 is a flowchart for describing a method of selecting a communication network with home network prioritization in country border regions.

FIG. 6 is a flowchart for describing a method of selecting a communication network with home network prioritization in country border regions. Such a method may be employed in connection with devices and components shown and described above in relation to FIGS. 1-4. For example, the steps may be performed by microprocessor 238 and communication subsystem 211 of mobile station 200 of FIG. 2. Beginning at a start block 602 of FIG. 6, a mobile station is operating on a visiting network in Country B (step 604) (e.g. visiting network 406 of FIG. 4). The visiting network in Country B is not the home network of the mobile station; the home network has a first MCC and the visiting network has a second MCC different from the first MCC.

Since the mobile station is not operating on its home network, a periodic "home network timer" (or HPLMN timer) has been set and running so that the mobile station may perform periodic scans for its home network. If the home network timer has not expired (step 606), the mobile station continues to wait until such expiration. If the home network timer has expired at step 606, the mobile station performs a scanning operation to identify all available networks within its coverage area (step 608). The available networks may include the home network of the mobile station which is in a bordering Country A (e.g. home network 402 of FIG. 4).

In the present technique, the mobile station compares the scan list of available networks with the home network to identify whether the home network is available (step 610). The mobile station does this by comparing MNC/MCC pairs in the scan list with the home MNC/MCC pair. If the home network is available as tested in step 610, the mobile station selects and registers with the home network (step 612). The home network is selected despite the fact that the MCC of the home network is different from the MCC of the visiting network with which the mobile station was previously operating. If the home network is not available at step 610, then the mobile station selects from those networks in Country B using network selection techniques (e.g. based on its prioritized network list) (step 614). Assuming the same visiting network is available when the home network is unavailable, the mobile station will continue operating with the visiting network. The timer is then reset (step 616) and the method repeats at step 606.

Advantageously, this unique operation eliminates the problems caused at country border regions when the mobile station is able to "see" networks from both countries. The mobile station no longer operates to ignore its own home network which has an MCC that differs from the MCC of its current serving network in the above-described scenario.

Final Comments. Network selection methods and apparatus with home network prioritization in country border regions have been described. In one illustrative example as described, a mobile station is associated with a home communication network having a home MCC. Being outside of the home network country, however, the mobile station selects and operates with a non-home communication network having a visiting MCC. After expiration of a timer, the mobile station scans to identify a plurality of communication networks in a coverage area within which the mobile station is operating. If the home communication network having the home MCC is identified as being available, the mobile station selects and operates with the home communication network. Otherwise, if a non-home communication network having the visiting MCC is identified as being available, the mobile station selects and operates with the non-home communication network.

A related method of selecting a communication network by a mobile station associated with a home communication network having a home MCC includes the acts of selecting and operating with a non-home communication network having a visiting MCC; scanning to identify a plurality of communication networks in a coverage area within which the mobile station is operating; and if the home communication network having the home MCC is identified as being available by the scanning, selecting and operating with the home communication network.

A communication system includes a first communication network having a first MCC associated with a first country and a second communication network having a second MCC associated with a second country. One or more mobile stations which are operable with the first and the second communication networks have the first communication network designated as its home communication network. The one or more mobile stations are operative to select and operate with the second communication network having the second MCC and, after expiration of a timer: scan to identify a plurality of communication networks in a coverage area within which the mobile station is operating; if the first communication network having the first MCC is identified as being available by the scan, select and operate with the first communication network; and otherwise, if the second communication network having the second MCC is identified as being available by the scan, select and operate with the second communication network.

The above-described embodiments of invention are intended to be examples only. Alterations, modifications, and variations may be effected to particular embodiments by those of skill in art without departing from scope of invention; which is defined solely by claims appended hereto.

What is claimed is:

1. A method of selecting a communication network by a mobile station associated with a home communication network having a home mobile country code (MCC), the method comprising:
    selecting and operating with a communication network having a visiting MCC different from the home MCC of the home communication network;
    setting and running a periodic home public land mobile network (HPLMN) timer in response to operating with the communication network having the visiting MCC;
    in response to each expiration of the periodic HPLMN timer while operating with the communication network having the visiting MCC:
    scanning to identify a plurality of communication networks in a coverage area within which the mobile station is operating;
    receiving, from the step of scanning, a plurality of mobile network code (MNC) and MCC pairs associated with the plurality of communication networks;
    if the home communication network having the home MCC is identified as being available by the scanning, selecting and operating with the home communication network; and
    otherwise, if the communication network having the visiting MCC is identified as being available by the scanning, continuing operation with the communication network having the visiting MCC.

2. The method of claim 1, wherein the home MCC is associated with a first country and the visiting MCC is associated with a second country which shares a border with the first country.

3. The method of claim 1, wherein the method is based on European Technical Standards Institute (ETSI) specification 23.122.

4. The method of claim 1, wherein the communication networks comprise Public Land Mobile Networks (PLMNs).

5. The method of claim 1, wherein the communication networks are operative in accordance with Global Systems for Mobile Communications (GSM).

6. A mobile station associated with a home communication network having a home Mobile Country Code (MCC), the mobile station comprising:
    a wireless transceiver;
    an antenna coupled to the wireless transceiver;
    one or more processors coupled to the wireless transceiver;
    said one or more processors being configured to select a communication network through which to communicate by:
    selecting and operating with a communication network having a visiting MCC different from the home MCC of the home communication network;
    setting and running a periodic home public land mobile network (HPLMN) timer in response to operating with the second communication network;
    in response to each expiration of the periodic HPLMN timer while operating with the second communication network:
    scanning to identify a plurality of communication networks in a coverage area within which the mobile station is operating;
    receiving, from the step of scanning, a plurality of mobile network code (MNC) and MCC pairs associated with the plurality of communication networks;
    if the home communication network having the home MCC is identified as being available by the scanning, selecting and operating with the home communication network; and
    otherwise, if the communication network having the visiting MCC is identified as being available by the scanning, continuing operation with the communication network having the visiting MCC.

7. The mobile station of claim 6, wherein the home MCC is associated with a first country and the visiting MCC is associated with a second country which shares a border with the first country.

8. The mobile station of claim 6, wherein the configuration of the one or more processors to select a communication network is based on European Technical Standards Institute (ETSI) specification 23.122.

9. The mobile station of claim 6, wherein the communication networks comprise Public Land Mobile Networks (PLMNs).

10. The mobile station of claim 6, wherein the communication networks are operative in accordance with Global Systems for Mobile Communications (GSM).

11. A communication system, comprising:
    a first communication network having a first Mobile Country Code (MCC) associated with a first country;
    a second communication network having a second MCC associated with a second country;
    one or more mobile stations which are operable with the first and the second communication networks;
    the one or more mobile stations having the first communication network designated as its home communication network;
    the one or more mobile stations being operative to:
    select and operate with the second communication network having the second MCC;
    set and run a periodic home public land mobile network HPLMN timer in response to operating with the second communication network;
    in response to each expiration of the periodic home network timer while operating with the second communication network:

scan to identify a plurality of communication networks in a coverage area within which the mobile station is operating;

receive, from the step of scanning, a plurality of mobile network code (MNC) and MCC pairs associated with the plurality of communication networks;

if the first communication network having the first MCC is identified as being available by the scan, select and operate with the first communication network; and otherwise, if the second communication network having the second MCC is identified as being available by the scan, continuing operation with the second communication network having the second MCC.

12. The communication system of claim 11, wherein the first country shares a common border with the second country.

13. The communication system of claim 11, wherein the operation of the one or more mobile stations for network selection is based on European Technical Standards Institute (ETSI) specification 23.122.

14. The communication system of claim 11, wherein the communication networks comprise Public Land Mobile Networks (PLMNs).

15. The communication system of claim 11, wherein the communication networks are operative in accordance with Global Systems for Mobile Communications (GSM).

16. A method of selecting a communication network by a mobile station associated with a home communication network having a home mobile country code (MCC) associated with a first country, the method comprising:

selecting and operating with a communication network having a visiting MCC associated with a second country which shares a border with the first country;

setting and running a periodic Home Public Land Mobile Network (HPLMN) timer in response to operating with the communication network having the visiting MCC;

in response to each expiration of the periodic HPLMN tinier while operating with the communication network having the visiting MCC:

scanning to identify a plurality of communication networks in a coverage area within which the mobile station is operating;

receiving, from the step of scanning, a plurality of mobile network code (MNC) and MCC pairs associated with the plurality of communication networks;

if the home communication network having the home MCC is identified as being available by the scanning, selecting and operating with the home communication network; and otherwise, if the communication network having the visiting MCC is identified as being available by the scanning, continuing operation with the communication network having the visiting MCC.

17. The method of claim 16, wherein the communication networks comprise Public Land Mobile Networks (PLMNs).

18. The method of claim 16, wherein the method is based on European Technical Standards Institute (ETSI) specification 23.122.

* * * * *